United States Patent
Hsiung et al.

(10) Patent No.: US 11,381,595 B2
(45) Date of Patent: Jul. 5, 2022

(54) TRANSPORT LAYER SECURITY SESSION MAN-IN-THE-MIDDLE ATTACK PREVENTION

(71) Applicant: International Business Machines Corporation, Armonk, NY (US)

(72) Inventors: Wei-Hsiang Hsiung, Taipei (TW); Sheng-Tung Hsu, Taipei (TW); Kuo-Chun Chen, Taipei (TW); Chih-Hung Chou, Yilan (TW)

(73) Assignee: International Business Machines Corporation, Armonk, NY (US)

( * ) Notice: Subject to any disclaimer, the term of this patent is extended or adjusted under 35 U.S.C. 154(b) by 907 days.

(21) Appl. No.: 16/185,111

(22) Filed: Nov. 9, 2018

(65) Prior Publication Data

US 2020/0153859 A1 May 14, 2020

(51) Int. Cl.
*H04L 9/40* (2022.01)
*G06F 21/60* (2013.01)

(52) U.S. Cl.
CPC ........ *H04L 63/1466* (2013.01); *G06F 21/606* (2013.01); *H04L 63/08* (2013.01); *H04L 63/123* (2013.01); *H04L 63/1416* (2013.01); *G06F 2221/2133* (2013.01)

(58) Field of Classification Search
CPC ... H04L 63/1466; H04L 63/123; H04L 63/08; H04L 63/1416; H04L 63/1475; H04L 63/168; G06F 21/606; G06F 2221/2133; G06F 21/36; G06F 21/562
See application file for complete search history.

(56) References Cited

U.S. PATENT DOCUMENTS

| | | | |
|---|---|---|---|
| 8,321,955 B2 | 11/2012 | Feng et al. | |
| 9,813,411 B2 | 11/2017 | Thibadeau et al. | |
| 2003/0226017 A1* | 12/2003 | Palekar | H04L 63/08 713/168 |
| 2009/0210712 A1 | 8/2009 | Fort | |
| 2011/0296509 A1* | 12/2011 | Todorov | H04L 9/3271 726/7 |
| 2013/0080769 A1* | 3/2013 | Cha | G06F 21/42 713/155 |
| 2014/0108800 A1* | 4/2014 | Lawrence | H04L 9/3297 713/168 |
| 2014/0137224 A1 | 5/2014 | Todorov | |

(Continued)

OTHER PUBLICATIONS

Karapanos et al., "On the Effective Prevention of TLS Man-in-the-Middle Attacks in Web Applications," Proceedings of the 23rd USENIX Security Symposium, Aug. 20-22, 2014, San Diego, CA, pp. 671-686.

*Primary Examiner* — Farid Homayounmehr
*Assistant Examiner* — Suman Debnath
(74) *Attorney, Agent, or Firm* — Yee & Associates, P.C.

(57) ABSTRACT

Preventing Transport Layer Security session man-in-the-middle attacks is provided. A first security digest generated by an endpoint device is compared with a second security digest received from a peer device. It is determined whether a match exists between the first security digest and the second security digest based on the comparison. In response to determining that a match does not exist between the first security digest and the second security digest, a man-in-the-middle attack is detected and a network connection for a Transport Layer Security session is terminated with the peer device.

16 Claims, 7 Drawing Sheets

(56) References Cited

U.S. PATENT DOCUMENTS

2016/0381080 A1* 12/2016 Reddem ................ H04L 63/205
  726/1
2017/0346851 A1* 11/2017 Drake ................. H04L 63/0428

* cited by examiner

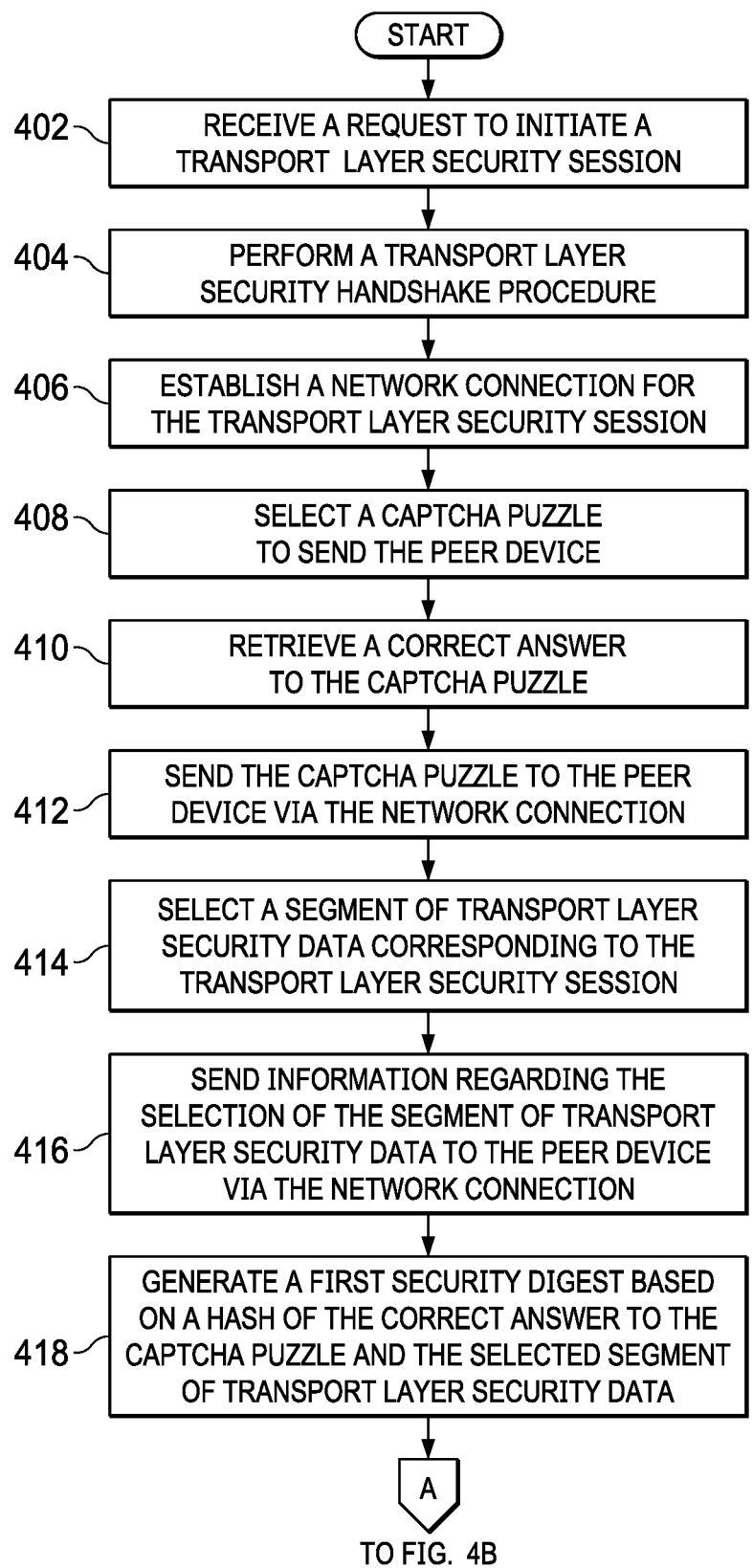

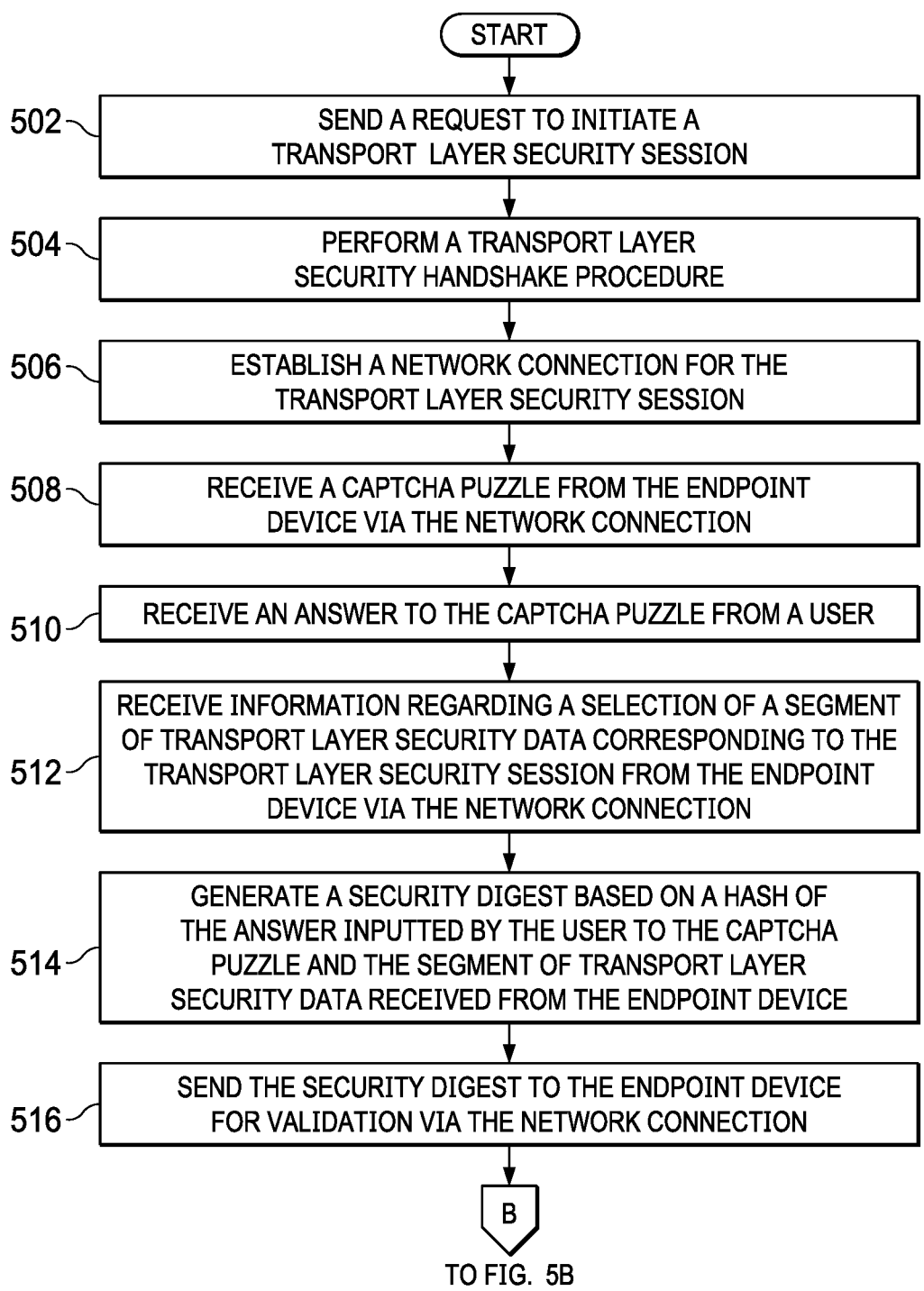

TRANSPORT LAYER SECURITY SESSION MAN-IN-THE-MIDDLE ATTACK PREVENTION

BACKGROUND

1. Field

The disclosure relates generally to network security and more specifically to preventing Transport Layer Security session man-in-the-middle attacks between data processing devices connected to a network.

2. Description of the Related Art

In network security, a man-in-the-middle attack is where an attacker secretly intercepts, relays, and possibly alters data, such as messages or transactions, between two network devices. For example, the man-in-the-middle attacker makes independent connections with both network devices and relays data between them, making the devices believe that they are directly communicating with one another over the network connection. Thus, the attacker is able to intercept, read, and then pass data between the two devices. In addition, the attacker may alter intercepted data and possibly inject new data. However, a man-in-the-middle attack can only succeed when the attacker remains undetected by impersonating each endpoint to their satisfaction.

SUMMARY

According to one illustrative embodiment, method for preventing Transport Layer Security session man-in-the-middle attacks is provided. A first security digest generated by an endpoint device is compared with a second security digest received from a peer device. It is determined whether a match exists between the first security digest and the second security digest based on the comparison. In response to determining that a match does not exist between the first security digest and the second security digest, a man-in-the-middle attack is detected and a network connection for a Transport Layer Security session is terminated with the peer device. According to other illustrative embodiments, a computer system and computer program product for preventing Transport Layer Security session man-in-the-middle attacks are provided.

BRIEF DESCRIPTION OF THE DRAWINGS

FIGS. 4A-4B are a flowchart illustrating a process for a Transport Layer Security session endpoint device in accordance with an illustrative embodiment; and FIGS. 5A-5B are a flowchart illustrating a process for a Transport Layer Security session peer device in accordance with an illustrative embodiment.

DETAILED DESCRIPTION

Figure 1:
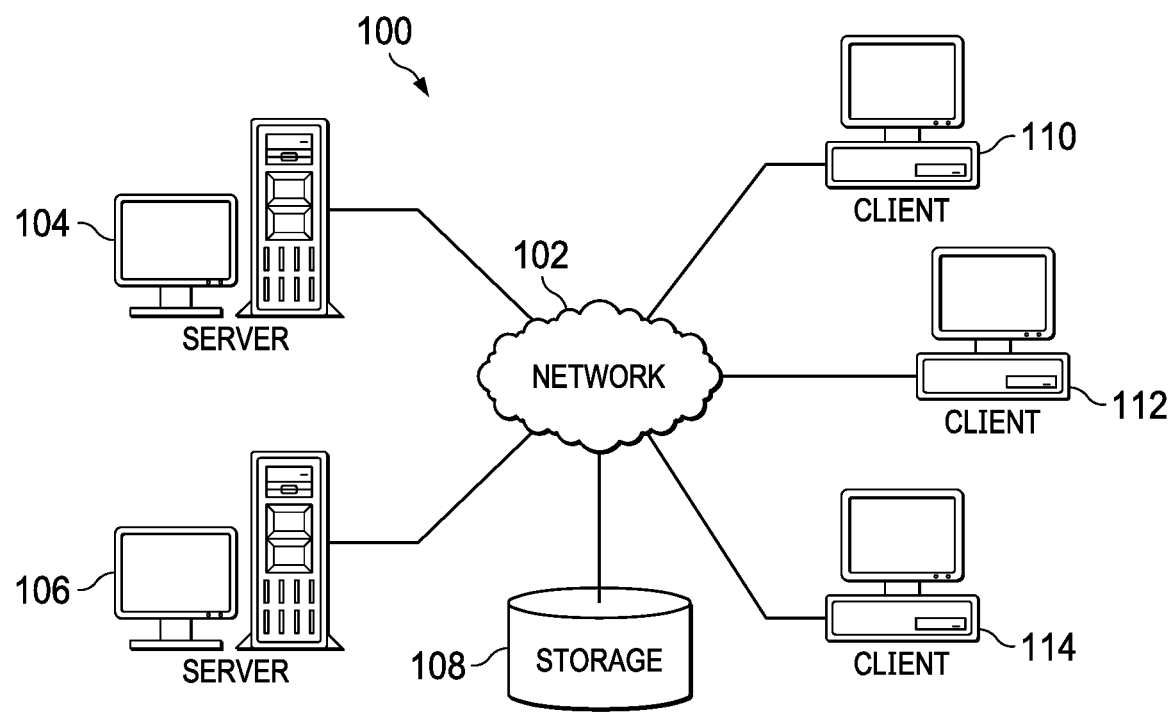
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
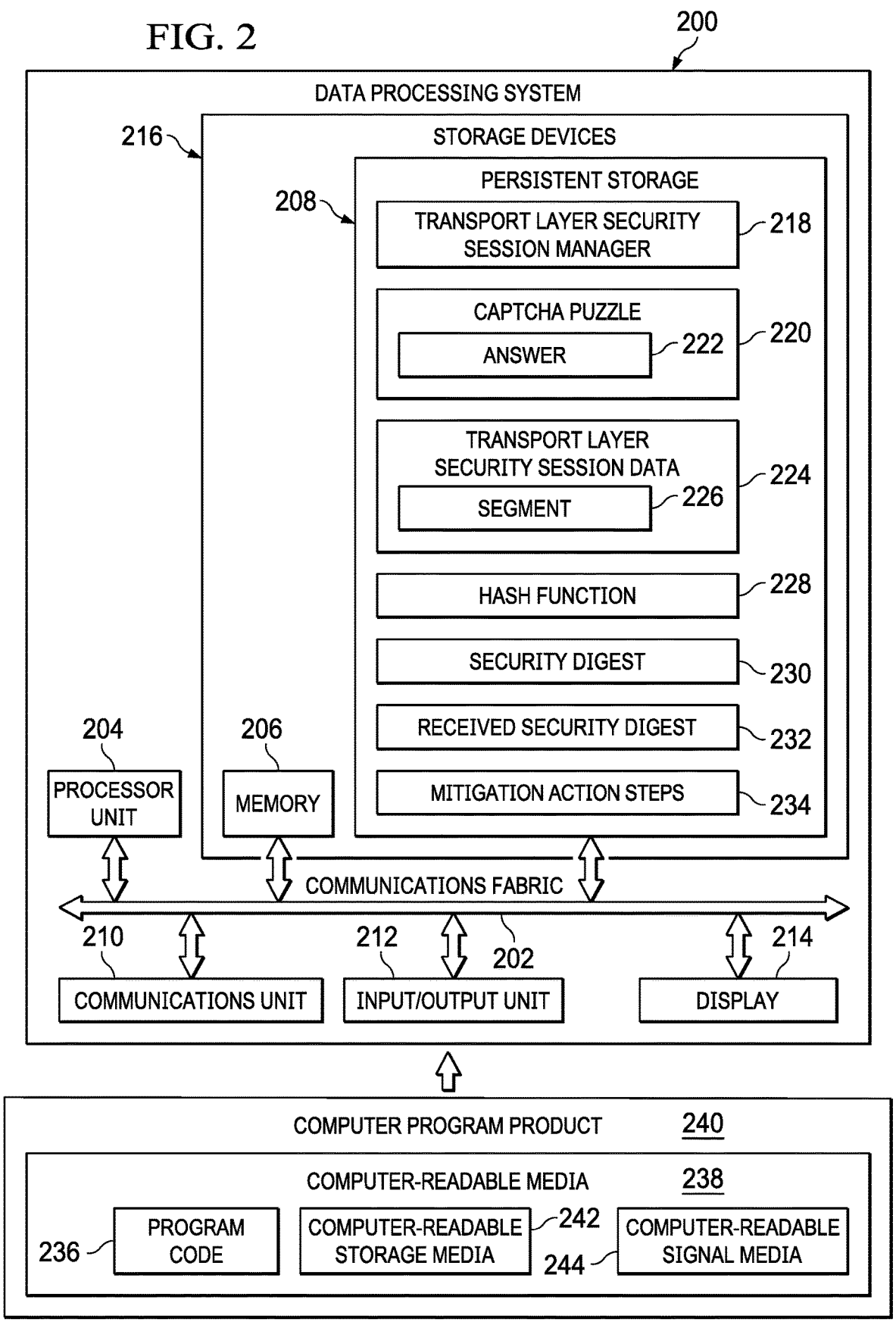
FIG. 2 is a diagram of a data processing system in which illustrative embodiments may be implemented.
Figure 3:
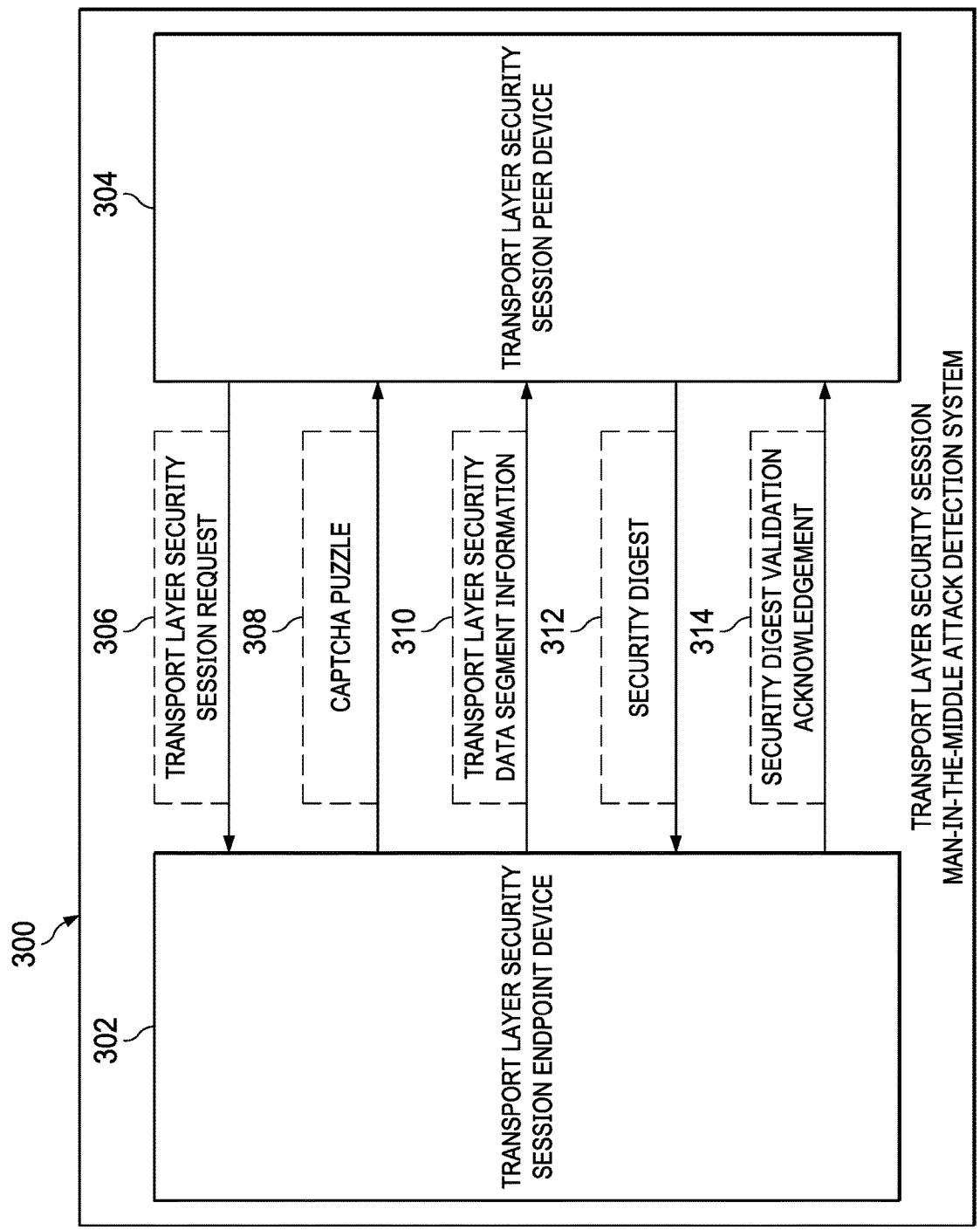
FIG. 3 is a diagram illustrating an example of a Transport Layer Security session man-in-the-middle attack detection system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide one or more services, such as, for example, e-commerce services, financial services, banking services, governmental services, educational services, reservation services, data services, and the like, requiring secure connections with client devices for data security. Also, it should be noted that server 104 and server 106 may each represent clusters of servers in data centers. Alternatively, server 104 and server 106 may each represent computing nodes in cloud environments hosting different services.

Server 104 and server 106 may utilize, for example, Transport Layer Security to provide the secure network connections for data security. Transport Layer Security is a cryptographic protocol designed to provide data communication security over a network. The network connection is secure or private because symmetric cryptography is used to encrypt the transmitted data. Session-specific cryptographic keys for the symmetric cryptographic encryption are uniquely generated for each network connection and are based on a shared secret that was negotiated at the start of the network session during the Transport Layer Security handshake procedure. The involved network devices negotiate the details of which encryption algorithm and cryptographic keys to use before data is transmitted. It should be noted that if one of the handshake procedure steps fails, then the secure connection is not created. Transport Layer Security is the most widely deployed security protocol used today and is used for Web browsers and other applications that require data to be securely exchanged over a network, such as, for example, financial transactions, file transfers, virtual private network connections, email, instant messaging, voice over Internet Protocol, and the like.

To increase network security, server 104 and server 106 may also utilize Completely Automated Public Turing test to tell Computers and Humans Apart (CAPTCHA) puzzles. CAPTCHA puzzles are a type of challenge-response test used to determine whether the service requesting user is a human or another computer where human interaction is essential to security. CAPTCHA puzzles require the user to simultaneously use invariant recognition, segmentation, and parsing to correctly answer the puzzle.

Network activities, such as, for example, online e-commerce transactions, search engine submissions, Web polls, Web registrations, free e-mail service registration, and other automated online services, are subject to software programs (e.g., Web bots) that mimic human user behavior in order to skew results of automated tasks or perform malicious activities, such as gathering e-mail addresses for spamming or placing hundreds of orders causing denial-of-service. In order to validate the requesting user, the user is presented with a CAPTCHA puzzle, such as, for example, a distorted word placed on top of a distorted background. The user must input the correct word into a field in order to complete the validation process. Computers have a difficult time decoding the distorted word while humans can readily decipher the text. Some CAPTCHA puzzles utilize pictures or images instead of distorted words. For example, a user may be presented with a series of pictures and asked what is the common element among all of the pictures. By inputting the correct common element, the user is validated and the computer knows it is dealing with a human user and not a Web bot.

Client 110, client 112, and client 114 also connect to network 102. Clients 110, 112, and 114 are client devices of server 104 and/or server 106. In this example, clients 110, 112, and 114 are shown as desktop or personal computers with wire communication links to network 102. However, it should be noted that clients 110, 112, and 114 are examples only and may represent other types of data processing systems, such as, for example, laptop computers, handheld computers, personal digital assistants, smart phones, smart watches, smart televisions, gaming devices, kiosks, and the like. Users of clients 110, 112, and 114 may utilize clients 110, 112, and 114 to access and utilize the services provided by server 104 and/or server 106.

Storage 108 is a network storage device capable of storing any type of data in a structured format or an unstructured format. In addition, storage 108 may represent a plurality of network storage devices. Further, storage 108 may store identifiers and network addresses for a plurality of different client devices, identifiers for a plurality of different users, CAPTCHA puzzles and their corresponding answers, hash functions, and the like. Furthermore, storage unit 108 may store other types of data, such as authentication or credential data that may include user names, passwords, and biometric data associated with client device users, for example.

In addition, it should be noted that network data processing system 100 may include any number of additional server computers, client devices, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. However, it should be noted that data processing system 200 is not limited to a server. In other words, illustrative embodiments may be implemented in other types of data processing systems, such as, for example, peer devices. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores Transport Layer Security session manager 218. However, it should be noted that even though Transport Layer Security session manager 218 is illustrated as residing in persistent storage 208, in an alternative illustrative embodiment Transport Layer Security session manager 218 may be a separate component of data processing system 200. For example, Transport Layer Security session manager 218 may be a hardware component coupled to communication fabric 202 or a combination of hardware and software components. Transport Layer Security session manager 218 controls the process of establishing a Transport Layer Security session with a peer device connected to a network, such as network 102 in FIG. 1. In addition, Transport Layer Security session manager 218 detects and prevents Transport Layer Security session man-in-the-middle attacks between data processing system 200 and the peer device.

After establishing the Transport Layer Security session with the peer device, Transport Layer Security session manager 218 sends CAPTCHA puzzle 220 to the peer device. CAPTCHA puzzle 220 may represent a plurality of different CAPTCHA puzzles that Transport Layer Security session manager 218 utilizes for data security. Answer 222 represents the correct answer to CAPTCHA puzzle 220. It should be noted that Transport Layer Security session manager 218 may store CAPTCHA puzzle 220 and answer 222 in persistent storage 208 or may alternatively retrieve CAPTCHA puzzle 220 and answer 222 from a remote storage, such as storage 108 in FIG. 1, of a CAPTCHA puzzle service provider.

Further, Transport Layer Security session manager 218 selects segment 226 from Transport Layer Security session data 224, which corresponds to the Transport Layer Security session with the peer device. Segment 226 may be, for example, an initial or first portion of Transport Layer Security session data 224 that includes a predetermined number of bytes, such as the first 20, 30, 40, or 50 bytes of session data. However, it should be noted that segment 226 may consist of any portion or any number of bytes from Transport Layer Security session data 224. Transport Layer Security session data 224 represent information corresponding to the Transport Layer Security session that Transport Layer Security session manager 218 established between data processing system 200 and the peer device. Transport Layer Security session manager 218 sends information regarding the selection of segment 226 to the peer device in addition to CAPTCHA puzzle 220.

Furthermore, Transport Layer Security session manager 218 utilizes hash function 228 to generate security digest 230. Security digest 230 is a hash of answer 222 and segment 226. Hash function 228 may be, for example, one-way cryptographic hash function.

Moreover, Transport Layer Security session manager 218 compares security digest 230 with received security digest 232 to determine whether a match exists between security digest 230 and received security digest 232. Received security digest 232 represents a security digest, which Transport Layer Security session manager 218 received from the peer device, consisting of a hash of a user inputted answer to CAPTCHA puzzle 220 and segment 226. Transport Layer Security session manager 218 determines that a match exists between security digest 230 and received security digest 232 when the hash values contained in security digest 230 are the same as, or are equivalent to, the hash values contained in received security digest 232. Conversely, Transport Layer Security session manager 218 determines that no match exists between security digest 230 and received security digest 232 when the hash values contained in security digest 230 are different from, or are nonequivalent to, the hash values contained in received security digest 232. However, it should be noted that in alternative illustrative embodiments, Transport Layer Security session manager 218 may utilize other criteria to determine whether a match does or does not exist.

If security digest 230 and received security digest 232 match based on the comparison, then Transport Layer Security session manager 218 continues the Transport Layer Security session with the peer device. If security digest 230 and received security digest 232 do not match, then Transport Layer Security session manager 218 determines that a man-in-the-middle attack is occurring and performs mitigation action steps 234. Mitigation action steps 234 may include, for example, Transport Layer Security session manager 218 terminating the Transport Layer Security session with the peer device and/or sending an alert to a security analyst for review and possible action. However, it should be noted that if Transport Layer Security session manager 218 determines that security digest 230 and received security digest 232 do not match, then Transport Layer Security session manager 218 may allow a predefined number of retries, such as, for example, one, two, or three retries, before determining that a man-in-the-middle attack is occurring and performing mitigation action steps 234. Security session manager 218 may allow the predefined number of retries just in case the user, for example, inadvertently inputted a wrong answer to CAPTCHA puzzle 220 during an authentication attempt.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 236 is located in a functional form on computer readable media 238 that is selectively removable and may be loaded onto or transferred to data processing system 200 for running by processor unit 204. Program code 236 and computer readable media 238 form computer program product 240. In one example, computer readable media 238 may be computer readable storage media 242 or computer readable signal media 244. Computer readable storage media 242 may include, for example, an optical or magnetic disc that is inserted or placed into a drive or other device that is part of persistent storage 208 for transfer onto a storage device, such as a hard drive, that is part of persistent storage 208. Computer readable storage media 242 also may take the form of a persistent storage, such as a hard drive, a thumb drive, or a flash memory that is connected to data processing system 200. In some instances, computer readable storage media 242 may not be removable from data processing system 200.

Alternatively, program code 236 may be transferred to data processing system 200 using computer readable signal media 244. Computer readable signal media 244 may be, for example, a propagated data signal containing program code 236. For example, computer readable signal media 244 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 236 may be downloaded over a network to persistent storage 208 from another device or data processing system through computer readable signal media 244 for use within data processing system 200. For instance, program code stored in a computer readable storage media in a data processing system may be downloaded over a network from the data processing system to data processing system 200. The data processing system providing program code 236 may be a server computer, a client computer, or some other device capable of storing and transmitting program code 236.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 242 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Man-in-the-middle attacks are one of the most common attacks for intercepting network session data between two connection endpoints. Man-in-the-middle attacks allow the attackers to eavesdrop and/or modify data content of a network session. A CAPTCHA puzzle can be easily solved by a human, but is more difficult for a machine to solve. However, CAPTCHA puzzles are still vulnerable to some well-articulated man-in-the-middle attacks, which allow the attackers to manipulate the data content of network sessions. Thus, illustrative embodiments also utilize Transport Layer Security on top of CAPTCHA puzzles. For those Transport Layer Security sessions where man-in-the-middle attacks are occurring, the Transport Layer Security session data on one peer device side is different from the other peer device side. Illustrative embodiments utilize a security digest, which consists of a cryptographic hash of a correct answer to a presented CAPTCHA puzzle and a selected Transport Layer Security session data segment, to detect and prevent man-in-the-middle attacks. The selected Transport Layer Security session data segment may be, for example, the first 32 bytes of the Transport Layer Security session data.

Utilizing these two factors (i.e., CAPTCHA puzzle and Transport Layer Security session data segment), a Transport Layer Security session endpoint device and its peer device are both able to generate a security digest during the Transport Layer Security session negotiation between the two network devices. The two network devices generate the security digest using a hash function, such as a one-way cryptographic hash function (e.g., Secure Hash Algorithm 256). If the security digests do not match, then the Transport Layer Security session endpoint device ends the network connection. One reason the security digests do not match is because the Transport Layer Security session data segments do not match, which indicates a man-in-the-middle attack. Another reason the security digests do not match is because of wrong CAPTCHA puzzle answer, which indicates either the user input the wrong answer or a man-in-the-middle attack is occurring. As a result, illustrative embodiments can effectively prevent Transport Layer Security session man-in-the-middle attacks and can be widely applied since Transport Layer Security is commonly used to protect network connections.

With reference now to FIG. 3, a diagram illustrating an example of a Transport Layer Security session man-in-the-middle attack detection system is depicted in accordance with an illustrative embodiment. Transport Layer Security session man-in-the-middle attack detection system 300 may be implemented in a network of data processing systems, such as network data processing system 100 in FIG. 1. Transport Layer Security session man-in-the-middle attack detection system 300 is a system of hardware and software components for detecting and preventing Transport Layer Security session man-in-the-middle attacks between a Transport Layer Security session endpoint device, such as, for example, data processing system 200, and a Transport Layer Security session peer device, such as, for example, client 110 in FIG. 1.

In this example, Transport Layer man-in-the-middle attack detection system 300 includes Transport Layer Security session endpoint device 302 and Transport Layer Security session peer device 304. However, it should be noted that Transport Layer man-in-the-middle attack detection system 300 may include any number and type of Transport Layer Security session endpoint devices and Transport Layer Security session peer devices.

Transport Layer Security session peer device 304 sends Transport Layer Security session request 306 to Transport Layer Security session endpoint device 302 to initiate establishment of a Transport Layer Security session between Transport Layer Security session peer device 304 and Transport Layer Security session endpoint device 302. In response, Transport Layer Security session endpoint device 302 performs a Transport Layer Security handshake procedure with Transport Layer Security session peer device 304. Upon successful completion of the Transport Layer Security handshake procedure, Transport Layer Security session endpoint device 302 establishes a Transport Layer Security session with Transport Layer Security session peer device 304 and sends CAPTCHA puzzle 308 and Transport Layer Security session data segment information 310 to Transport Layer Security session peer device 304. CAPTCHA puzzle 308 and Transport Layer Security session data segment information 310 may be, for example, CAPTCHA puzzle 220 and information regarding selection of segment 226 of Transport Layer Security session data 224 in FIG. 2.

Subsequently, Transport Layer Security session peer device 304 sends security digest 312 to Transport Layer Security session endpoint device 302. Security digest 312 is a hash of a user inputted answer to the CAPTCHA puzzle and the Transport Layer Security session data segment corresponding to the segment selection information sent to Transport Layer Security session peer device 304 by Transport Layer Security session endpoint device 302. Security digest 312 may be, for example, received security digest 232 in FIG. 2. If Transport Layer Security session endpoint device 302 determines that a match exists between security digest 312 and a security digest generated by Transport Layer Security session endpoint device 302, then Transport Layer Security session endpoint device 302 sends security digest validation acknowledgement 314 to Transport Layer Security session peer device 304 and continues the Transport Layer Security session with Transport Layer Security session peer device 304. Alternatively, if Transport Layer Security session endpoint device 302 determines that a match does not exists between security digest 312 and the security digest generated by Transport Layer Security session endpoint device 302, then Transport Layer Security session endpoint device 302 detects a man-in-the-middle attack and discontinues the Transport Layer Security session with Transport Layer Security session peer device 304.

Figure 4B:
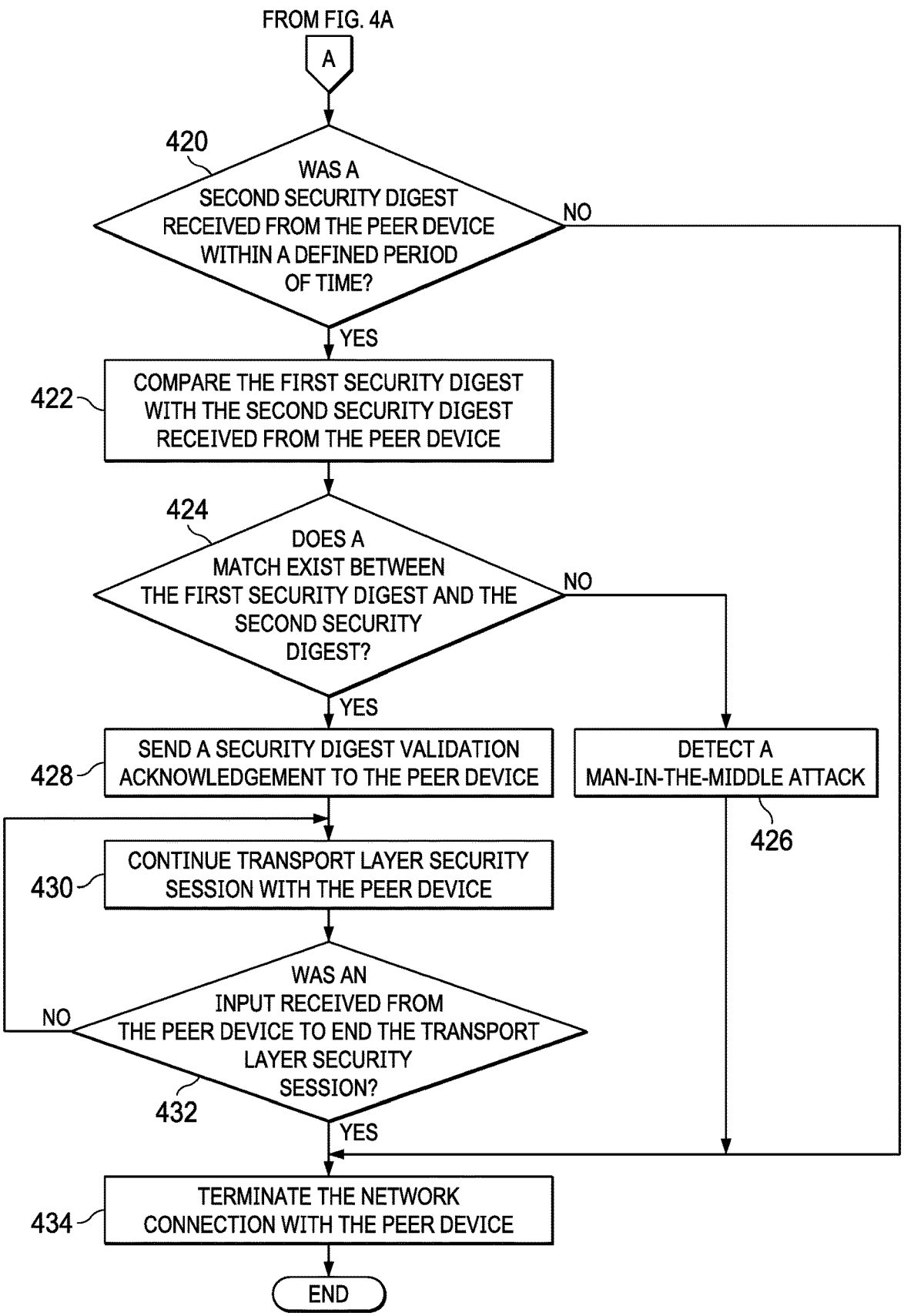

With reference now to FIGS. 4A-4B, a flowchart illustrating a process for a Transport Layer Security session endpoint device is shown in accordance with an illustrative embodiment. The process shown in FIGS. 4A-4B may be implemented in an endpoint data processing system, such as, for example, Transport Layer Security session endpoint device 302 in FIG. 3.

The process begins when the endpoint device receives a request to initiate a Transport Layer Security session with the endpoint device from a peer device (step 402). The peer device may be, for example, Transport Layer Security session peer device 304 in FIG. 3. The endpoint device performs a Transport Layer Security handshake procedure with the peer device (step 404). The endpoint device establishes a network connection with the peer device for the Transport Layer Security session upon successful completion of the Transport Layer Security handshake procedure (step 406).

The endpoint device selects a CAPTCHA puzzle to send to the peer device (step 408). The CAPTCHA puzzle may be, for example, CAPTCHA puzzle 220 in FIG. 2. In addition, the endpoint device retrieves a correct answer to the CAPTCHA puzzle (step 410). The correct answer may be, for example, answer 222 in FIG. 2.

The endpoint device sends the CAPTCHA puzzle to the peer device via the network connection (step 412). Further, the endpoint device selects a segment of Transport Layer Security data corresponding to the Transport Layer Security session (step 414). The segment of Transport Layer Security data may be, for example, segment 226 of Transport Layer Security session data 224 in FIG. 2. The endpoint device sends information regarding the selection of the segment of Transport Layer Security data to the peer device via the network connection (step 416).

Furthermore, the endpoint device, using a one-way cryptographic hash function, generates a first security digest based on a hash of the correct answer to the CAPTCHA puzzle and the selected segment of Transport Layer Security data (step 418). The one-way cryptographic hash function may be, for example, hash function 228 in FIG. 2. The endpoint device also makes a determination as to whether a second security digest was received from the peer device within a defined period of time (step 420). The defined period of time may be, for example, thirty seconds, one minute, two minutes, three minutes, five minutes, or the like.

If the endpoint device determines that a second security digest was not received from the peer device within the defined period of time, no output of step 420, then the process proceeds to step 434. If the endpoint device determines that a second security digest was received from the peer device within the defined period of time, yes output of step 420, then the endpoint device compares the first security digest generated by the endpoint device with the second security digest received from the peer device (step 422).

Afterward, the endpoint device makes a determination as to whether a match exists between the first security digest and the second security digest based on the comparison (step 424). If the endpoint device determines that a match does not exist between the first security digest and the second security digest, no output of step 424, then the endpoint device detects a man-in-the-middle attack (step 426) and the process proceeds to step 434 thereafter. If the endpoint device determines that a match does exist between the first security digest and the second security digest, yes output of step 424, then the endpoint device sends a security digest validation acknowledgement to the peer device (step 428). The security digest validation acknowledgement may be, for example, security digest validation acknowledgement 312 in FIG. 3. In addition, the endpoint device continues the Transport Layer Security session with the peer device (step 430).

Subsequently, the endpoint device makes a determination as to whether an input was received from the peer device to end the Transport Layer Security session (step 432). If the endpoint device determines that an input was not received from the peer device to end the Transport Layer Security session, no output of step 432, then the process returns to step 430 where the endpoint device continues the Transport Layer Security session with the peer device. If the endpoint device determines that an input was received from the peer device to end the Transport Layer Security session, yes output of step 432, then the endpoint device terminates the network connection with the peer device (step 434). Thereafter, the process terminates.

Figure 5B:
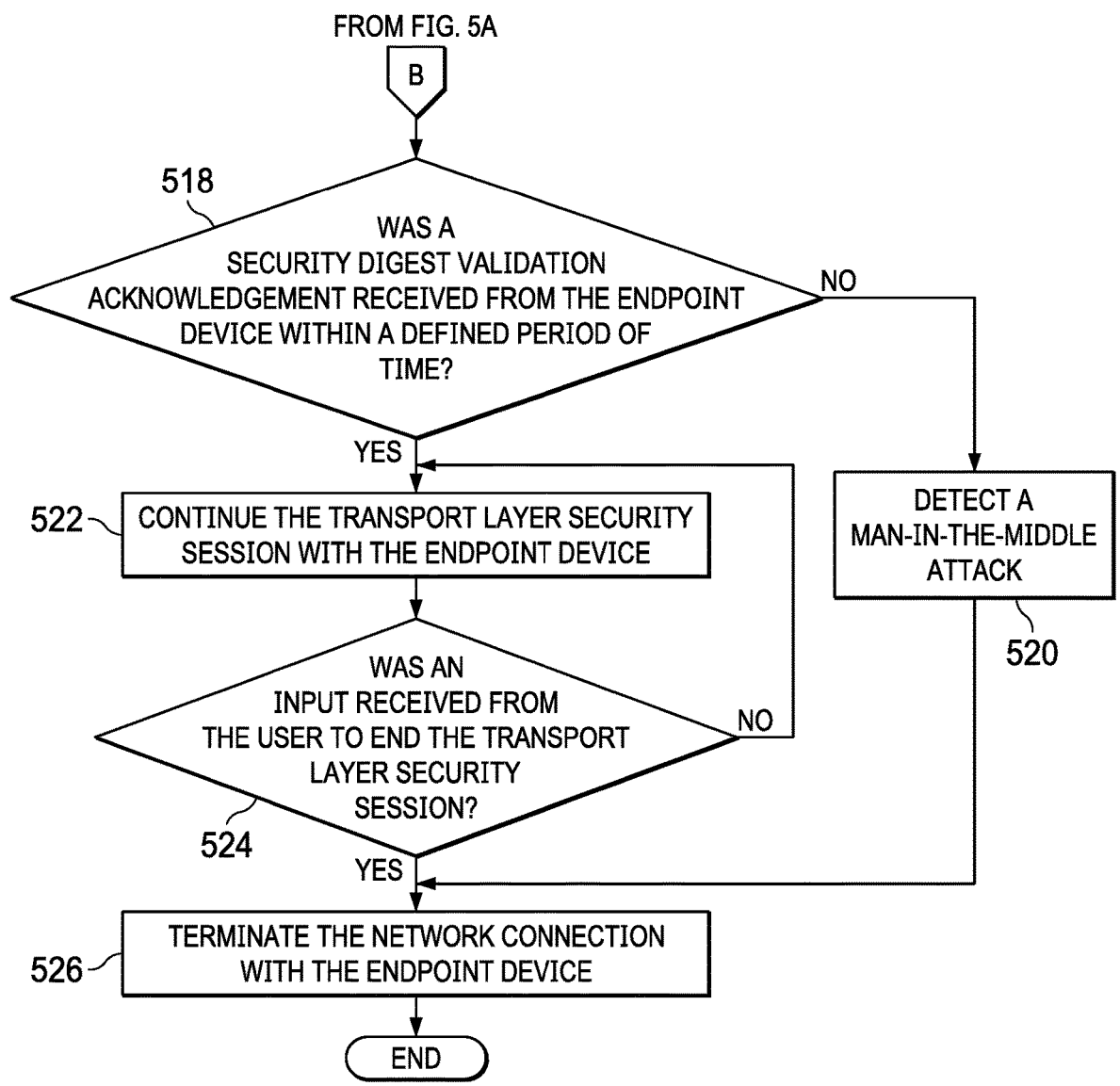

With reference now to FIGS. 5A-5B, a flowchart illustrating a process for a Transport Layer Security session peer device is shown in accordance with an illustrative embodiment. The process shown in FIGS. 5A-5B may be implemented in a peer data processing device, such as, for example, Transport Layer Security session peer device 304 in FIG. 3.

The process begins when the peer device sends a request to initiate a Transport Layer Security session with an endpoint device (step 502). The endpoint device may be, for example, Transport Layer Security session endpoint device 302 in FIG. 3. The peer device performs a Transport Layer Security handshake procedure with the endpoint device (step 504). The peer device establishes a network connection with the endpoint device for the Transport Layer Security session upon successful completion of the Transport Layer Security handshake procedure (step 506).

Afterward, the peer device receives a CAPTCHA puzzle from the endpoint device via the network connection (step 508). Subsequently, the peer device receives an answer to the CAPTCHA puzzle from a user of the peer device (step 510). In addition, the peer device receives information regarding a selection of a segment of Transport Layer Security data corresponding to the Transport Layer Security session from the endpoint device via the network connection (step 512). In other words, the peer device receives the Transport Layer Security session data segment selection information and gets that selected segment of data from the Transport Layer Security session according to the segment selection information.

The peer device, using a one-way cryptographic hash function, generates a security digest based on a hash of the answer inputted by the user to the CAPTCHA puzzle and the segment of Transport Layer Security data corresponding to the segment selection information received from the endpoint device (step 514). Afterward, the peer device sends the security digest to the endpoint device for validation via the network connection (step 516).

The peer device makes a determination as to whether a security digest validation acknowledgement was received from the endpoint device within a defined period of time (step 518). If the peer device determines that a security digest validation acknowledgement was not received from the endpoint device within the defined period of time, no output of step 518, then the peer device detects a man-in-the-middle attack (step 520) and the process proceeds to step 526 thereafter. If the peer device determines that a security digest validation acknowledgement was received from the endpoint device within the defined period of time, yes output of step 518, then the peer device continues the Transport Layer Security session with the endpoint device (step 522).

Subsequently, the peer device makes a determination as to whether an input was received from the user of the peer device to end the Transport Layer Security session (step 524). If the peer device determines that an input was not received from the user of the peer device to end the Transport Layer Security session, no output of step 524, then the process returns to step 522 where the peer device continues the Transport Layer Security session with the endpoint device. If the peer device determines that an input was received from the user of the peer device to end the Transport Layer Security session, yes output of step 524, then the peer device terminates the network connection with the endpoint device (step 526). Thereafter, the process terminates.

Thus, illustrative embodiments of the present invention provide a computer-implemented method, computer system, and computer program product for preventing Transport Layer Security session man-in-the-middle attacks between data processing devices connected to a network. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for preventing Transport Layer Security session man-in-the-middle attacks, the method comprising:
comparing a first security digest generated by an endpoint device with a second security digest received from a peer device;
determining whether a match exists between the first security digest and the second security digest based on the comparing;
responsive to determining that a match does not exist between the first security digest and the second security digest, detecting a man-in-the-middle attack and terminating a network connection for a Transport Layer Security session with the peer device;
selecting a segment of Transport Layer Security data corresponding to the Transport Layer Security session;
sending information regarding selection of the selected segment of Transport Layer Security data to the peer device via the network connection; and
generating the first security digest based on both a hash of a retrieved correct answer to a CAPTCHA puzzle and the selected segment of Transport Layer Security data corresponding to the Transport Layer Security session.

2. The method of claim 1 further comprising:
responsive to determining that a match does exist between the first security digest and the second security digest, sending a security digest validation acknowledgement to the peer device and continuing the Transport Layer Security session with the peer device.

3. The method of claim 1 further comprising:
receiving a request to initiate the Transport Layer Security session with the endpoint device from the peer device;
performing a Transport Layer Security handshake procedure with the peer device; and
establishing the network connection with the peer device for the Transport Layer Security session upon successful completion of the Transport Layer Security handshake procedure.

4. The method of claim 1 further comprising:
selecting a CAPTCHA puzzle to send to the peer device; and
sending the CAPTCHA puzzle to the peer device via the network connection.

5. The method of claim 1, wherein the selected segment of Transport Layer Security data is an initial portion of Transport Layer Security data corresponding to the Transport Layer Security session that includes a predetermined number of bytes.

6. The method of claim 1, wherein the second security digest is generated based on a hash of a user inputted answer to the CAPTCHA puzzle and the selected segment of Transport Layer Security data corresponding to the information regarding the selection received from the endpoint device by the peer device.

7. The method of claim 1 further comprising:
determining whether the second security digest was received from the peer device within a defined period of time;
responsive to determining that the second security digest was not received from the peer device within the defined period of time, terminating the network connection for the Transport Layer Security session with the peer device; and
responsive to determining that the second security digest was received from the peer device within the defined period of time, comparing the first security digest generated by the endpoint device with the second security digest received from the peer device.

8. A computer system for preventing Transport Layer Security session man-in-the-middle attacks, the computer system comprising:
a bus system;
a storage device connected to the bus system, wherein the storage device stores program instructions; and
a processor connected to the bus system, wherein the processor executes the program instructions to:
compare a first security digest generated by the computer system with a second security digest received from a peer device;
determine whether a match exists between the first security digest and the second security digest based on comparing the first security digest and the second security digest;

detect a man-in-the-middle attack and terminate a network connection for a Transport Layer Security session with the peer device in response to determining that a match does not exist between the first security digest and the second security digest;

select a segment of Transport Layer Security data corresponding to the Transport Layer Security session;

send information regarding selection of the selected segment of Transport Layer Security data to the peer device via the network connection; and generate the first security digest based on both a hash of a retrieved correct answer to a CAPTCHA puzzle and the selected segment of Transport Layer Security data corresponding to the Transport Layer Security session.

9. The computer system of claim 8, wherein the processor further executes the program instructions to:

send a security digest validation acknowledgement to the peer device and continue the Transport Layer Security session with the peer device in response to determining that a match does exist between the first security digest and the second security digest.

10. The computer system of claim 8, wherein the processor further executes the program instructions to:

receive a request to initiate the Transport Layer Security session from the peer device;

perform a Transport Layer Security handshake procedure with the peer device; and establish the network connection with the peer device for the Transport Layer Security session upon successful completion of the Transport Layer Security handshake procedure.

11. A computer program product for preventing Transport Layer Security session man-in-the-middle attacks, the computer program product comprising a computer readable storage medium having program instructions embodied therewith, the program instructions executable by a computer to cause the computer to perform a method comprising:

comparing a first security digest generated by the computer with a second security digest received from a peer device;

determining whether a match exists between the first security digest and the second security digest based on the comparing;

responsive to determining that a match does not exist between the first security digest and the second security digest, detecting a man-in-the-middle attack and terminating a network connection for a Transport Layer Security session with the peer device;

selecting a segment of Transport Layer Security data corresponding to the Transport Layer Security session;

sending information regarding selection of the selected segment of Transport Layer Security data to the peer device via the network connection; and generating the first security digest based on both a hash of a retrieved correct answer to a CAPTCHA puzzle and the selected segment of Transport Layer Security data corresponding to the Transport Layer Security session.

12. The computer program product of claim 11 further comprising:

responsive to determining that a match does exist between the first security digest and the second security digest, sending a security digest validation acknowledgement to the peer device and continuing the Transport Layer Security session with the peer device.

13. The computer program product of claim 11 further comprising:

receiving a request to initiate the Transport Layer Security session from the peer device;

performing a Transport Layer Security handshake procedure with the peer device; and establishing the network connection with the peer device for the Transport Layer Security session upon successful completion of the Transport Layer Security handshake procedure.

14. The computer program product of claim 11 further comprising:

selecting a CAPTCHA puzzle to send to the peer device; and sending the CAPTCHA puzzle to the peer device via the network connection.

15. The computer program product of claim 11, wherein the selected segment of Transport Layer Security data is an initial portion of Transport Layer Security data corresponding to the Transport Layer Security session that includes a predetermined number of bytes.

16. The computer program product of claim 11, wherein the second security digest is generated based on a hash of a user inputted answer to the CAPTCHA puzzle and the selected segment of Transport Layer Security data corresponding to the information regarding the selection received from the computer by the peer device.

* * * * *